US009495750B2

(12) United States Patent
Miyatani et al.

(10) Patent No.: US 9,495,750 B2
(45) Date of Patent: Nov. 15, 2016

(54) IMAGE PROCESSING APPARATUS, IMAGE PROCESSING METHOD, AND STORAGE MEDIUM FOR POSITION AND ORIENTATION MEASUREMENT OF A MEASUREMENT TARGET OBJECT

(71) Applicant: CANON KABUSHIKI KAISHA, Tokyo (JP)

(72) Inventors: Sonoko Miyatani, Tokyo (JP); Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/531,879

(22) Filed: Nov. 3, 2014

(65) Prior Publication Data

US 2015/0125035 A1    May 7, 2015

(30) Foreign Application Priority Data

Nov. 5, 2013    (JP) .................................. 2013-229808

(51) Int. Cl.
| | | |
|---|---|---|
| *G06K 9/00* | (2006.01) | |
| *G06T 7/00* | (2006.01) | |
| *B25J 9/16* | (2006.01) | |
| *G06T 7/20* | (2006.01) | |

(52) U.S. Cl.
CPC ............ *G06T 7/0046* (2013.01); *B25J 9/1697* (2013.01); *G06T 7/001* (2013.01); *G06T 7/2046* (2013.01); *G06T 2207/10028* (2013.01); *G06T 2207/20076* (2013.01); *Y10S 901/47* (2013.01)

(58) Field of Classification Search
None
See application file for complete search history.

(56) References Cited

U.S. PATENT DOCUMENTS

| | | | | |
|---|---|---|---|---|
| 6,169,553 B1 * | 1/2001 | Fuller | .................... | G06T 15/04 345/419 |
| 7,091,993 B1 * | 8/2006 | Ahmad | .................... | G06T 5/008 345/629 |
| 7,376,284 B2 * | 5/2008 | Tao | ........................ | G06T 7/0051 382/285 |
| 7,733,342 B2 * | 6/2010 | Kim | ......................... | G06T 7/60 345/426 |
| 7,809,159 B2 * | 10/2010 | Ishiyama | .............. | G06T 7/0048 382/103 |
| 8,437,554 B2 * | 5/2013 | Kim | ...................... | G06T 7/0053 348/135 |
| 8,643,717 B2 * | 2/2014 | Li | ......................... | G01B 11/02 348/128 |
| 9,129,438 B2 * | 9/2015 | Aarts et al. | ........... | G06T 15/205 |

(Continued)

FOREIGN PATENT DOCUMENTS

JP    2012-026974 A    2/2012

OTHER PUBLICATIONS

Z. Zhang, "A flexible new technique for camera calibration," IEEE Transactions on Pattern Analysis and Machine Intelligence, vol. 22, No. 11, pp. 1330-1334, 2000.

(Continued)

*Primary Examiner* — Avinash Yentrapati
(74) *Attorney, Agent, or Firm* — Canon USA, Inc. IP Division

(57) ABSTRACT

To perform robust position and orientation measurement even in a situation where noise exist, an image including a target object is obtained, an approximate position and orientation of the target object included in the obtained image are obtained, information related to a shadow region of the target object in the obtained image is estimated, the approximate position and orientation are corrected on the basis of the estimated information related to the shadow region, and a position and orientation of the target object in the image are derived on the basis of the corrected approximate position and orientation and held model information.

32 Claims, 14 Drawing Sheets

(56) References Cited

U.S. PATENT DOCUMENTS

| | | | |
|---|---|---|---|
| 9,237,256 B2* | 1/2016 | Tanaka | H04N 1/4097 |
| 2001/0033685 A1* | 10/2001 | Ishiyama | G06K 9/00221 |
| | | | 382/154 |
| 2003/0137673 A1* | 7/2003 | Cox | G01B 11/25 |
| | | | 356/601 |
| 2003/0219146 A1* | 11/2003 | Jepson | G06K 9/32 |
| | | | 382/103 |
| 2005/0212794 A1* | 9/2005 | Furukawa | G06T 11/001 |
| | | | 345/419 |
| 2005/0286059 A1* | 12/2005 | Ellenrieder | G06T 7/0018 |
| | | | 356/614 |
| 2006/0165293 A1* | 7/2006 | Hamanaka | G06K 9/00228 |
| | | | 382/209 |
| 2006/0233423 A1* | 10/2006 | Najafi | G06K 9/3208 |
| | | | 382/103 |
| 2007/0031028 A1* | 2/2007 | Vetter | G06K 9/00208 |
| | | | 382/154 |
| 2007/0086624 A1* | 4/2007 | Breed | G06K 9/00362 |
| | | | 382/104 |
| 2008/0089610 A1* | 4/2008 | Tao | G06T 17/05 |
| | | | 382/285 |
| 2008/0205701 A1* | 8/2008 | Shamaie | G06F 3/017 |
| | | | 382/103 |
| 2008/0267454 A1* | 10/2008 | Kobayashi | G06T 7/0028 |
| | | | 382/106 |
| 2009/0116728 A1* | 5/2009 | Agrawal | B22D 11/1265 |
| | | | 382/154 |
| 2009/0316953 A1* | 12/2009 | Ezekiel | G01S 7/412 |
| | | | 382/103 |
| 2011/0206274 A1* | 8/2011 | Tateno | G06T 7/0046 |
| | | | 382/154 |
| 2011/0211066 A1* | 9/2011 | Fujiki | H04N 7/181 |
| | | | 348/135 |
| 2011/0216962 A1* | 9/2011 | Kim | G06T 7/0053 |
| | | | 382/154 |
| 2011/0254950 A1* | 10/2011 | Bibby | G06T 7/0081 |
| | | | 348/135 |
| 2011/0273442 A1* | 11/2011 | Drost | G06K 9/6211 |
| | | | 345/419 |
| 2012/0008831 A1* | 1/2012 | Tanigawa | G01B 11/002 |
| | | | 382/103 |
| 2012/0045095 A1* | 2/2012 | Tate | G06T 5/003 |
| | | | 382/103 |
| 2012/0148103 A1* | 6/2012 | Hampel | G06K 9/00771 |
| | | | 382/103 |
| 2012/0268567 A1* | 10/2012 | Nakazato | G01B 11/03 |
| | | | 348/46 |
| 2013/0076865 A1* | 3/2013 | Tateno | G01B 11/03 |
| | | | 348/46 |
| 2013/0114861 A1* | 5/2013 | Takizawa | G06T 7/0044 |
| | | | 382/106 |
| 2013/0121592 A1* | 5/2013 | Fujiki | G01B 11/002 |
| | | | 382/195 |
| 2013/0195365 A1* | 8/2013 | Van Beek | G06K 9/6211 |
| | | | 382/199 |
| 2013/0245828 A1* | 9/2013 | Tateno | B25J 9/1697 |
| | | | 700/259 |
| 2014/0009802 A1* | 1/2014 | Tanaka | H04N 1/4097 |
| | | | 358/498 |
| 2014/0079287 A1* | 3/2014 | Daniell | G01S 15/89 |
| | | | 382/103 |
| 2015/0242682 A1* | 8/2015 | Holz | G06K 9/3233 |
| | | | 382/103 |

OTHER PUBLICATIONS

M. Kimura, "Projector Calibration using Arbitrary Planes and Calibrated Camera", Computer Vision and Pattern Recognition, CVPR, 2007.

* cited by examiner

IMAGE PROCESSING APPARATUS, IMAGE PROCESSING METHOD, AND STORAGE MEDIUM FOR POSITION AND ORIENTATION MEASUREMENT OF A MEASUREMENT TARGET OBJECT

BACKGROUND OF THE INVENTION

Field of the Invention

The present invention relates to a technology for position and orientation measurement of a measurement target object.

Description of the Related Art

Automation by using a robot is being progressed to improve a production efficiency in a production site. In a construction operation by the robot, a target object is to be recognized to obtain an accurate position and orientation. As a method of realizing this, a method of using a luminance image or a range image in which the target object is picked up has been developed. Since noise generated by various causes coexists in the luminance image or the range image, a method having high robustness with respect to the noise is preferably employed.

For example, according to Japanese Patent Laid-Open No. 2012-26974, position and orientation measurement of a camera is performed by a model fitting technique with which measurement data obtained from the luminance image or the range image in which the target object is picked up is fitted to a geometric model. Specifically, an approximate position and orientation of the target object are prepared, and the position and orientation are optimized such that an edge extracted from the luminance image or a distance value obtained from the range image is more appropriately fitted to the geometric model. As a technique to increase the robustness in the position and orientation measurement of the camera, a method of generating a plurality of approximate positions and orientations at predetermined sampling intervals in ranges that may be taken by the position and orientation of the camera, performing iterative calculation of the fitting in the respective approximate position and orientation, and adopting a highest-ranting fitting result as a fitting final result has been proposed.

However, according to the method described in Japanese Patent Laid-Open No. 2012-26974, in a case where noise such as shadow or specular reflection exists in the luminance image or the range image in which the target object is picked up, the optimal position and orientation may not be obtained in some cases, and the accuracy and the robustness are reduced. For example, a local solution may occur while the edge due to the shadow existing around the target object is erroneously associated with the edge of the geometric model, and a correct fitting result may not be obtained in some cases.

SUMMARY OF THE INVENTION

To solve the above-mentioned issue, for example, an image processing apparatus according to an aspect of the present invention includes: an image obtaining unit configured to obtain an image including a target object; a holding unit configured to hold model information of the target object; an obtaining unit configured to obtain an approximate position and orientation of the target object included in the image; an estimation unit configured to estimate information related to a shadow region of the target object in the obtained image; a correction unit configured to correct the approximate position and orientation on the basis of the estimated information related to the shadow region; and a derivation unit configured to derive a position and orientation of the target object in the image on the basis of the approximate position and orientation corrected by the correction unit and the model information.

In addition, for example, an image processing apparatus according to another aspect of the present invention includes: an image obtaining unit configured to obtain an image including a target object; a holding unit configured to hold model information of the target object; an obtaining unit configured to obtain an approximate position and orientation of the target object included in the image; an estimation unit configured to estimate a reflection region of the target object in the obtained image; a correction unit configured to correct the approximate position and orientation on the basis of the estimated reflection region; and a derivation unit configured to derive a position and orientation of the target object in the image on the basis of the approximate position and orientation corrected by the correction unit and the model information.

Moreover, for example, an image processing apparatus according to another aspect of the present invention includes: an image obtaining unit configured to obtain an image including a target object; a holding unit configured to hold model information of the target object and probability information of a position and orientation which the target object may take; an obtaining unit configured to obtain an approximate position and orientation of the target object included in the image; a correction unit configured to correct the approximate position and orientation on the basis of the held probability information; and a derivation unit configured to derive the position and orientation of the target object in the image on the basis of the approximate position and orientation corrected by the correction unit and the model information held by the holding unit.

According to the present specification, it is possible to perform the position and orientation measurement having the high robustness.

Further features of the present invention will become apparent from the following description of exemplary embodiments with reference to the attached drawings.

DESCRIPTION OF THE EMBODIMENTS

Figure 1:
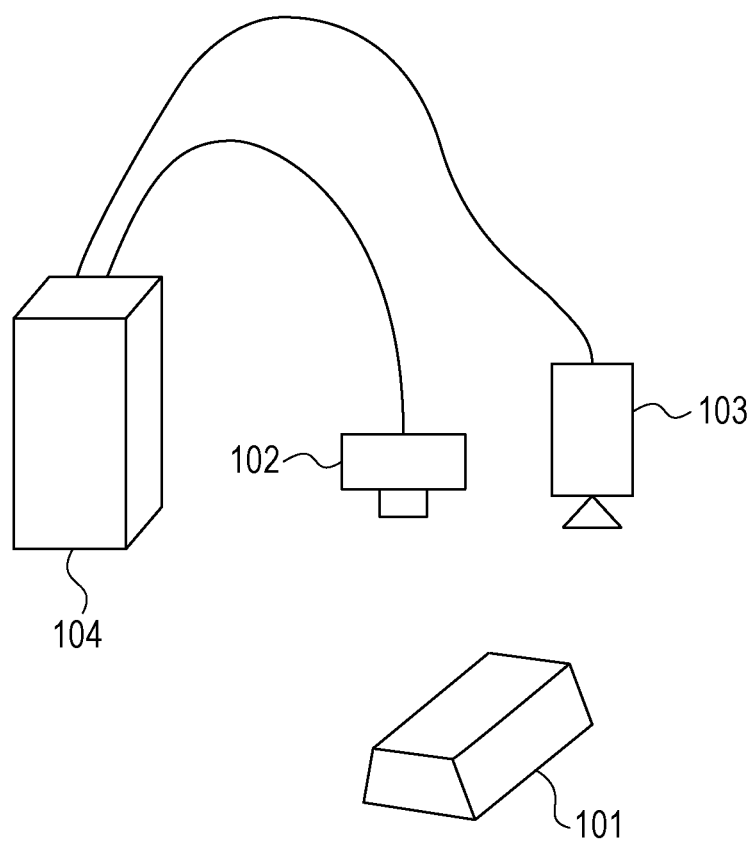
FIG. 1 illustrates a configuration of a system according to first to third exemplary embodiments.

Hereinafter, exemplary embodiments of the present invention will be described with reference to the accompanying drawings.
First Exemplary Embodiment FIG. 1 is a schematic diagram of a system configuration of an image processing apparatus according to the first exemplary embodiment.

A measurement target object 101 is an object set as a target where a position and an orientation (position and orientation) of the object are measured. According to the present exemplary embodiment, to simplify the description, only one measurement target object 101 as a position and orientation measurement target is placed at a certain position as illustrated in FIG. 1. However, position and orientation measurement processing which will be described below does not greatly rely on the shape, the number, or the installation mode of the measurement target object 101. For example, the present exemplary embodiment can also be applied to a case where a certain position and orientation of the measurement target object is measured in a state in which a plurality of measurement target objects having different shapes are mixed and piled up.

An image pickup apparatus 102 is configured to pick up a still image or a moving image in a physical space and is used for picking up the measurement target object 101 irradiated with light by a projector 103 according to the present exemplary embodiment. The image pickup apparatus 102 transmits the picked-up image (captured image) to an image processing apparatus 104. Intrinsic parameters of the image pickup apparatus 102 (a focal length, a principal point position, and a lens distortion parameter) are previously calibrated, for example, by Zhang's method which will be described below.

The projector 103 is used for irradiating the measurement target object 101 with predetermined light. Any of uniform light (full lighting light), slit light for obtaining the range image, and the like may be used as the predetermined light. The projector 103 includes a liquid crystal projector. The intrinsic parameters of the projector 103 (the focal length, the principal point position, and the lens distortion parameter) are previously calibrated, for example, by the method disclosed in the following document. An apparatus other than the projector 103 may be used so long as the projection using the slit light can be performed, and for example, a projector using a digital mirror device (DMD) or LCOS may be used.

Z. Zhang, "A flexible new technique for camera calibration," IEEE Transactions on Pattern Analysis and Machine Intelligence, vol. 22, no. 11, pp. 1330-1334, 2000.

The image processing apparatus 104 is connected to the image pickup apparatus 102 and the projector 103. The image processing apparatus 104 performs an operation control of the projector 103 and the image pickup apparatus 102 and also calculates the position and orientation of the measurement target object 101 by using the captured image obtained from the image pickup apparatus 102. The image processing apparatus 104 is an apparatus configured to execute the calculation for the position and orientation of the measurement target object 101 by holding a program in which specific processing of the exemplary embodiment of the present invention is described and executing the program by a built-in CPU. The image processing apparatus 104 also includes a user interface such as a key board, a mouse, or a monitor.

Figure 14:
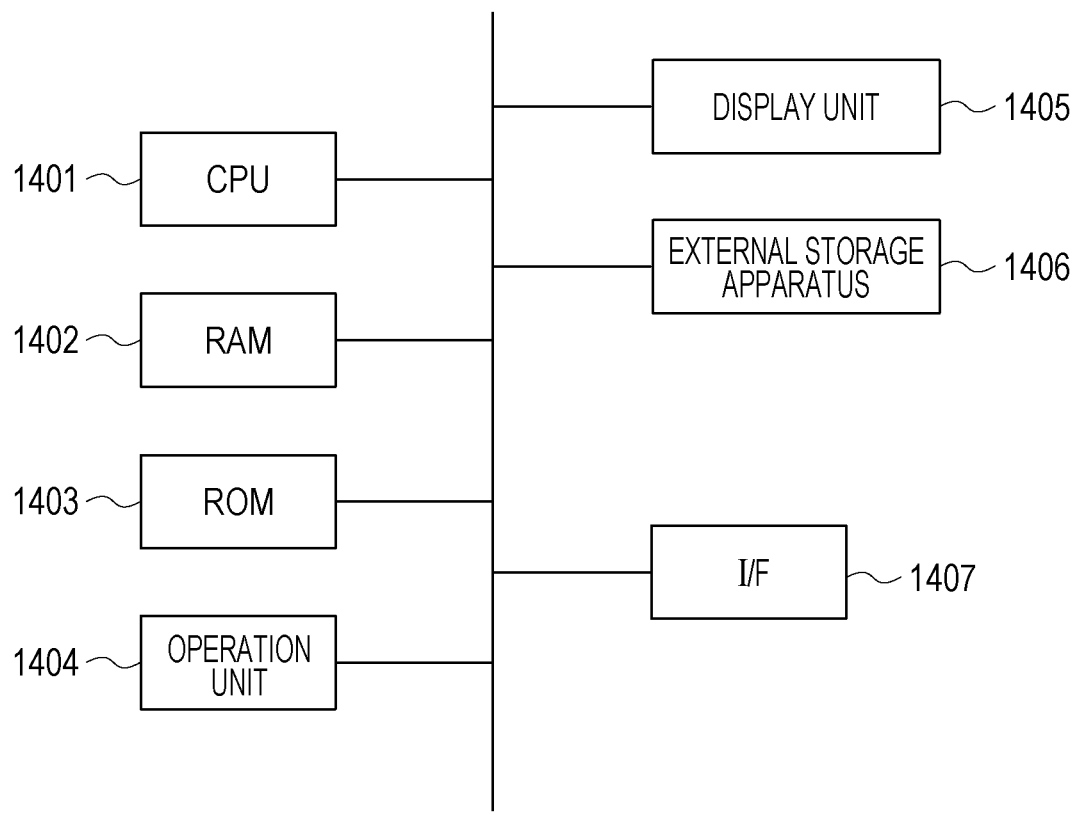
FIG. 14 is a block diagram of an example hardware configuration that can be applied to an image processing apparatus.

An example hardware configuration of an apparatus applicable to the image processing apparatus 104 will be described by using a block diagram of FIG. 14.

A CPU 1401 executes processing by using a computer program or data stored in a RAM 1402 or a ROM 1403 to perform an operation control of the entirety of this apparatus and also executes the above-described respective processings that are supposed to be performed by the image processing apparatus 104.

The RAM 1402 includes an area for temporarily storing the computer program or the data loaded from the external storage apparatus 1406, data received from the outside via an interface (I/F) 1407, and the like. The RAM 1402 further includes a work area used when the CPU 1401 executes various processings. That is, the RAM 1402 can appropriately provide various areas. The ROM 1403 stores setting data, a boot program, and the like of this apparatus.

An operation unit 1404 is constituted by a key board, a mouse, and the like. When a user of this apparatus operates the operation unit 1404, various instructions can be input to the CPU 1401. For example, the above-described adjustment area can be designated by operating the operation unit 1404.

A display unit 1405 is constituted by a CRT, a liquid crystal screen, or the like and can display processing results from the CPU 1401 in the form of images, characters, and the like.

The external storage apparatus 1406 is a high-capacity information storage apparatus represented by a hard disc drive apparatus. The external storage apparatus 1406 saves an operation system (OS) and the computer program or the data used for the CPU 1401 to execute the above-described respective processings that are supposed to be executed by the respective function units in the image processing apparatus 104 illustrated in FIGS. 1 and 2. This data also includes information described as the given information in the above explanation. The computer program or the data saved in the external storage apparatus 1406 is appropriately loaded onto the RAM 1402 in accordance with a control by the CPU 1401 and set as a processing target of the CPU 1401.

The I/F 1407 is used for this apparatus to establish communication with an external device, and for example, the image pickup apparatus 102, the projector 103, and the like can be connected to the I/F 1407. The above-described respective units are all connected to a bus 1408.

Figure 2:
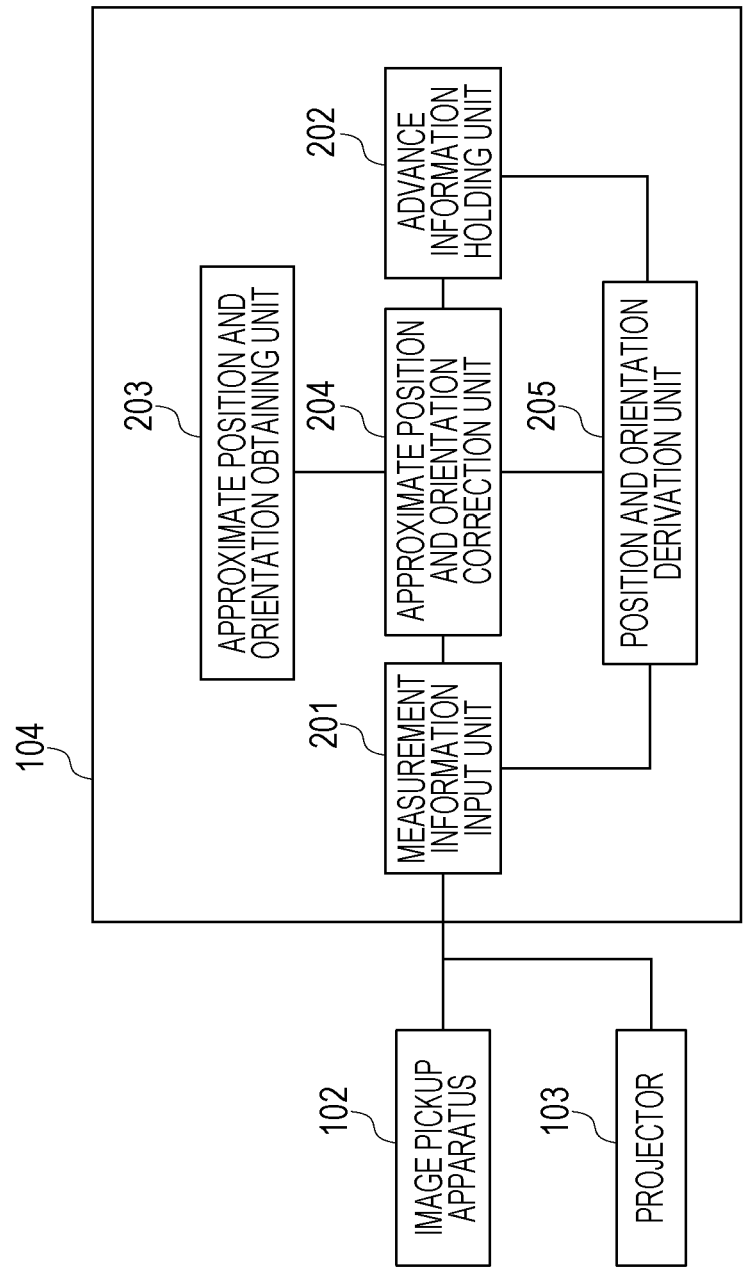
FIG. 2 illustrates a module configuration of a program according to the first to third exemplary embodiments.

Next, an example function configuration of the image processing apparatus 104 will be described by using a block diagram of FIG. 2. A measurement information input unit 201 takes a luminance image obtained by the image pickup apparatus 102 as the measurement information into the image processing apparatus 104 (image obtainment).

An advance information holding unit 202 holds the information of the positional relationship between the projector 103 and the image pickup apparatus 102 as advance information. While pattern light is emitted from the projector 103 to be picked up by the camera, the information of the positional relationship between the projector 103 and the image pickup apparatus 102 is obtained by a method described in the following document, for example.

M. Kimura, "Projector Calibration using Arbitrary Planes and Calibrated Camera", Computer Vision and Pattern Recognition, CVPR, 2007.

The advance information holding unit 202 holds three-dimensional model information of the measurement target object 101. The three-dimensional model information is a CAD model itself that can be dealt with three-dimensional CAD software or is obtained by converting a three-dimensional CAD model into a plurality of polygon elements used in a computer graphics field. According to the present exemplary embodiment, a three-dimensional geometric model that simulates a shape of the measurement target object 101 and is composed of polygon elements is used as the three-dimensional model information. However, the model information is not limited to this, and for example, a two-dimensional model may also be used.

An approximate position and orientation obtaining unit 203 obtains approximate values of the position and orientation of the measurement target object with respect to an image pickup apparatus 102 (obtainment of the approximate position and orientation). The input approximate position and orientation are prepared as initial values of iterative calculations for obtaining the position and orientation of the measurement target object 101. According to the present exemplary embodiment, the image processing apparatus 104 continuously performs measurement in a time axis direction and uses previous measurement values (measurement values at the previous time) as the approximate position and orientation.

However, the input method for the approximate values of the position and orientation is not limited to this. For example, velocity and angular velocity of the object are estimated by using a time-series filter on the basis of the measurement for the past position and orientation, and the current position and orientation may be predicted from the velocity and angular velocity estimated as the past position and orientation. In addition, images of the target object picked up in various orientations are held as templates, and broad position and orientation of the measurement target object 101 may be estimated by performing template matching (pattern matching) on an input image. Alternatively, in a case where the measurement for the position and orientation of the measurement target object 101 can be performed by another sensor, output values obtained by the sensor may be used as the approximate values of the position and orientation.

The sensor may be, for example, a magnetic sensor that measures a position and orientation while magnetic fields emitted by a transmitter are received by a receiver worn by the object. The sensor may also be an optical sensor that measures a position and orientation while a marker arranged on the object is picked up by a camera which is fixed in a scene. In addition, any sensor may be employed so long as the sensor measures a six-degree-of-freedom position and orientation. Moreover, in a case where the position and orientation of the arranged object are roughly found in advance, those values are used as approximate values.

An approximate position and orientation correction unit 204 corrects the approximate position and orientation obtained by the approximate position and orientation obtaining unit 203 on the basis of advance information held by the advance information holding unit 202. Although specific processing will be described below, according to the present exemplary embodiment, the approximate position and orientation are shifted in a direction where a shadow of the measurement target object 101 does not exist (direction opposite to the shadow), so that it is possible to avoid erroneous association of the edges in the position and orientation calculation processing.

A position and orientation derivation unit 205 derives (calculates) the position and orientation of the measurement target object on the basis of the approximate position and orientation corrected by the approximate position and orientation correction unit 204 and the three-dimensional model information. Specifically, on the basis of the captured image obtained by the image pickup apparatus 102, an edge detection unit that is not illustrated detects the edge from the luminance image corresponding to the measurement information. Subsequently, an association unit that is not illustrated repeatedly performs association with the held model edge and optimized calculation by a least-square method for the position and orientation in which a sum total of distances between corresponding points becomes minimum to derive the position and orientation of the measurement target object 101.

The above is the explanation regarding the example configuration of the image processing apparatus 104.

Figure 3:
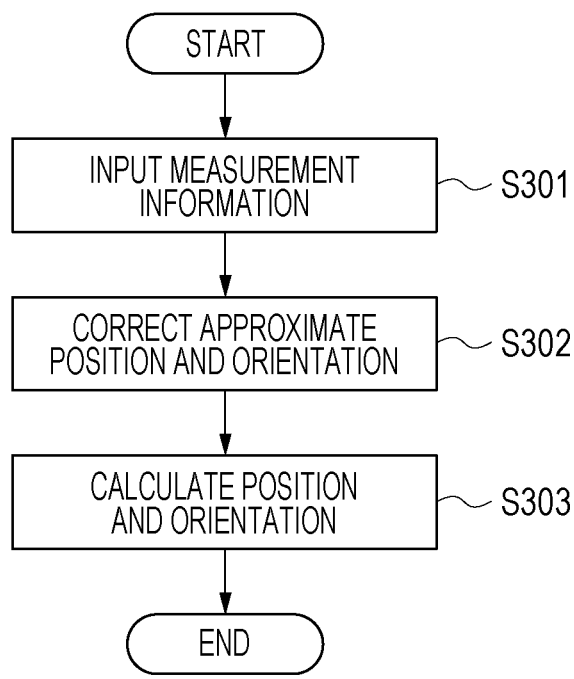
FIG. 3 is a flow chart of the position and orientation calculation processing procedure according to the first to third exemplary embodiments.

Next, a processing procedure of the position and orientation calculation according to the present exemplary embodiment will be described. FIG. 3 is a flow chart of the a processing procedure of the position and orientation calculation according to the present exemplary embodiment.

Step S301

First, in step S301, the measurement information input unit 201 obtains a luminance image in which the measurement target object 101 is picked up from the image pickup apparatus 102 and transmits the luminance image to the position and orientation derivation unit 205. The luminance image is an image obtained when the measurement target object 101 irradiated with light by using the projector 103 is picked up by the image pickup apparatus 102. However, the luminance image previously held in an external memory or on a network may be read by the measurement information input unit 201.

Step S302

Next, in step S302, the approximate position and orientation correction unit 204 corrects the approximate position and orientation of the measurement target object 101 on the basis of the positional relationship information held by the advance information holding unit 202. A correction direction of the approximate position and orientation is set as a direction vector at a time when the direction vector from the measurement target object 101 to the projector 103 is projected onto an image plane of the image pickup apparatus 102. The correction amount of the approximate position and orientation is set as a width of a shadow region of the measurement target object 101 which is generated by the illumination from the projector 103.

According to the present exemplary embodiment, the correction direction is obtained as follows.

First, a projection matrix P for projecting a three-dimensional position of the measurement target object 101 (Xo, Yo, Zo) and a three-dimensional position of the projector 103 (Xp, Yp, Zp) onto the image plane of the image pickup apparatus 102 is obtained. The three-dimensional position of the measurement target object 101 is set as positional components of the approximate position and orientation of the measurement target object with respect to the camera. The three-dimensional position of the projector 103 is obtained on the basis of the approximate position and orientation of the measurement target object 101 with respect to the image pickup apparatus 102 and the information of the positional relationship between the projector and the camera corresponding to the advance information. The projection matrix P is presented by a product K·RT formed by a camera parameter K (Expression 1) and from a transformation matrix RT a world coordinate system to a camera coordinate system (Expression 2).

$$K = \begin{bmatrix} a & b & c \\ 0 & d & e \\ 0 & 0 & 1 \end{bmatrix} \tag{1}$$

$$RT = \begin{bmatrix} 1 & 0 & 0 & 0 \\ 0 & 1 & 0 & 0 \\ 0 & 0 & 1 & 0 \end{bmatrix} \tag{2}$$

Herein, the camera coordinate system is set as the world coordinate system. Accordingly, the projection matrix P is represented by (Expression 3). It is noted that respective elements a, b, c, d, and e of the camera parameter K are unique to the camera and previously obtained as described above.

$$P = \begin{bmatrix} a & b & c & 0 \\ 0 & d & e & 0 \\ 0 & 0 & 1 & 0 \end{bmatrix} \tag{3}$$

Next, a position (uo, vo) on the image plane of the measurement target object 101 and a position (up, vp) on the image plane of the projector 103 are obtained from the projection matrix P, homogeneous coordinates (Xo, Yo, Zo, 1) of the three-dimensional position of the measurement target object 101 and homogeneous coordinates (Xp, Yp, Zp, 1) the three-dimensional position of the image pickup apparatus 102, and relationship expressions (Expression 4) and (Expression 5) of homogeneous coordinates (uo, vo, 1) and (up, vp, 1) of points where the respective homogeneous coordinates are projected onto the image plane. Subsequently, a vector r'=(up−uo, vp−vo) from the position (uo, vo) from the image plane of the measurement target object 101 to the position (up, vp) on the image plane of the projector 103 is obtained. Subsequently, the vector is further transformed into a unit vector r=r'/|r'|, and this is set as the correction direction.

$$\begin{bmatrix} u_o \\ v_o \\ 1 \end{bmatrix} = P / Z_o \begin{bmatrix} X_o \\ Y_o \\ Z_o \\ 1 \end{bmatrix} \tag{4}$$

$$\begin{bmatrix} u_p \\ v_p \\ 1 \end{bmatrix} = P / Z_p \begin{bmatrix} X_p \\ Y_p \\ Z_p \\ 1 \end{bmatrix} \tag{5}$$

According to the present exemplary embodiment, the correction amount is obtained by using the height of the measurement target object 101 obtained from the three-dimensional model information held by the advance information holding unit 202, the information of the positional relationship between the projector 103 and the image pickup apparatus 102, and the approximate position and orientation of the measurement target object 101.

Figure 4:
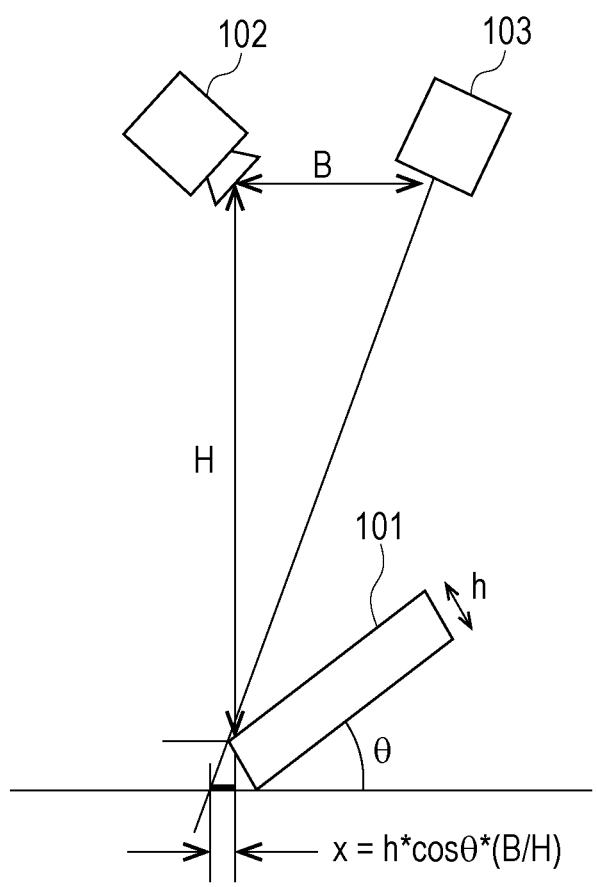
FIG. 4 illustrates a principle of a calculation method for a width of a shadow according to the first exemplary embodiment.

Specifically, as illustrated in FIG. 4, an angle defined by the measurement target object 101 and the horizontal plane is set as θ. Subsequently, a height h of the measurement target object 101 is obtained from the three-dimensional model held by the advance information holding unit 202.

In a case where the direction in which the measurement target object 101 is arranged is previously determined, the height h of the measurement target object 101 is set as a height from the installation plane when the measurement target object 101 is arranged in the determined direction. On the other hand, in a case where this direction is not previously determined, the height h is set as a height when the measurement target object 101 is arranged in a direction so as to be stable. For example, the stable direction may be set as a direction in which the center of gravity of the measurement target object 101 is lowered.

In addition, a smallest bounding box surrounding the measurement target object 101 may be used. In this case, among six arranging methods with which respective surfaces of the bounding box are in contact with the installation plane, the height h is set as a height of the bounding box when the bounding box is arranged in a direction in which the center of gravity of the measurement target object 101 is the lowest. It is however noted that the height h is not limited to this, and any method may be employed so long as a height in the most probable orientation of the measurement target object 101 can be set.

A resultant by multiplying the obtained height h, cos θ, and a ratio B/H of a distance H from the image pickup apparatus 102 to the measurement target object and a distance B between the image pickup apparatus 102 and the projector 103 is obtained as a width of the shadow (h×cos θ×(B/H)). Then, the obtained width of the shadow is set as a correction amount w.

The approximate position and orientation of the measurement target object 101 are corrected on the basis of the correction direction and the correction amount obtained by the above-described method. Specifically, w·r is added to the position X of the approximate position and orientation (the position X, the orientation R). That is, the approximate position and orientation after the correction become the position (X+w·r) and the orientation R.

Accordingly, the approximate position and orientation shifts in the direction where the shadow does not exist, and it is therefore possible to avoid the local solution when the edge of the model is erroneously associated with the edge due to the shadow region in the subsequent position and orientation calculation processing.

With regard to the correction direction or the correction amount, the value may be manually designated by a user via a user interface provided to the image processing apparatus 104.

Step S303

In step S303, the position and orientation of the measurement target object 101 are calculated by processing which will be described below by using the approximate position and orientation corrected in step S302.

Figure 5:
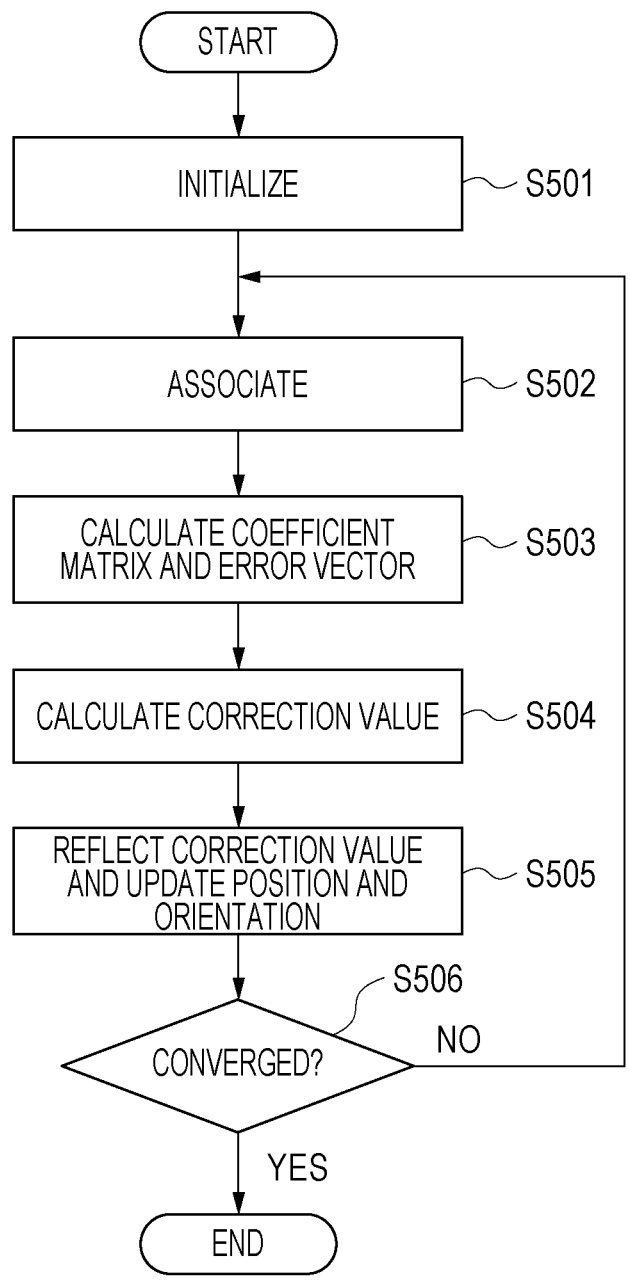
FIG. 5 is a flow chart of a detail procedure of the position and orientation calculation processing according to the first to third exemplary embodiments.

FIG. 5 is a flow chart for illustrating a detail procedure of the position and orientation calculation processing for calculating the position and orientation by the optimized calculation using the approximate position and orientation illustrated in step S303.

According to the present exemplary embodiment, the position and orientation are calculated by repeatedly correcting the approximate position and orientation of the position and orientation (hereinafter, represented by s) of the measurement target object through iterative calculation by Gauss-Newton method. Herein, the position and orientation are optimized such that the sum total of the distances with respect to the edge of the geometric model projected onto the image on the basis of the position and orientation estimated as the edge detected on the luminance image is minimized. More specifically, this is represented as a linear function of a minute change of the position and orientation of the object respectively by a signed distance between a point and a straight line on the luminance image and first-order Taylor expansion. Subsequently, the linear simultaneous equation related to the minute change of the position and orientation is established and solved such that the signed distance becomes 0, and the minute change of the position and orientation of the object is obtained to repeatedly correct the position and orientation.

Step S501

In step S501, the position and orientation derivation unit 205 performs initialization. Herein, the approximate position and orientation corrected in step S302 are set as the position and orientation of the measurement target object 101.

Step S502

In step S502, the position and orientation derivation unit 205 performs edge association. First, the respective edges of the three-dimensional geometric model are projected onto the image plane on the basis of the set an approximate position and orientation of the measurement target object 101. After that, the edge association is performed.

Figure 6A:
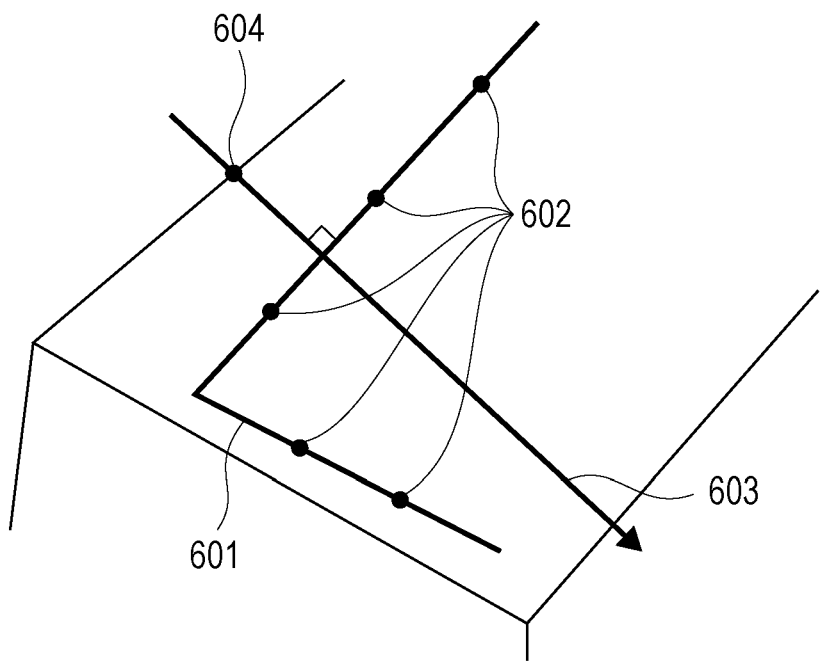
FIGS. 6A and 6B illustrate a principle of a search for a corresponding point according to the first to third exemplary embodiments.
Figure 6B:
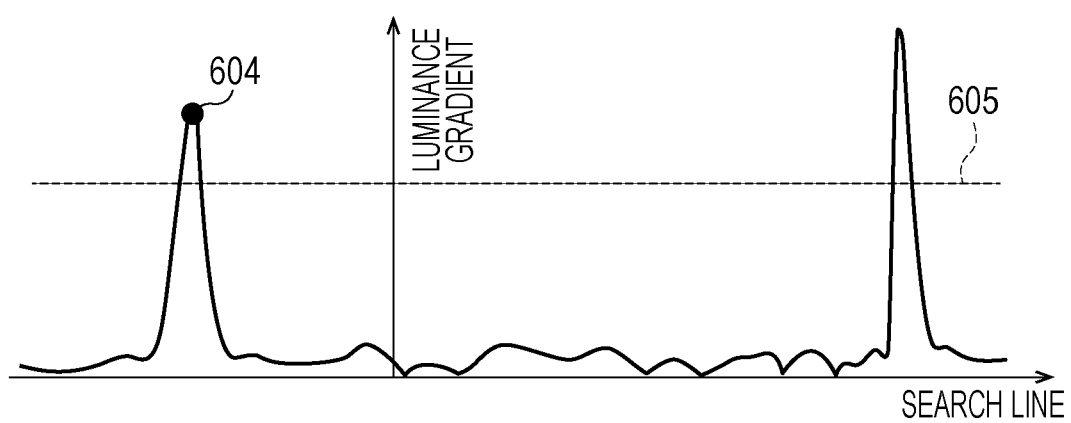

FIGS. 6A and 6B illustrate an edge association method. FIG. 6A illustrates projection of the edge of the geometric model onto the luminance image. First, control points 602 are set on a projected edge 601 at equal intervals on the image (in the image), and for each of the control points 602, a search line 603 is drawn in a normal direction of the projected edge 601. One-dimensional edges are detected in a predetermined range of the search line where the control point is set as the origin, and the point closest to the control point among the detected edges is held as the corresponding point. FIG. 6B is a graphic representation in which the origin is the control point, the horizontal axis represents the search line, and the vertical axis represents absolute values of the luminance gradient. The edge is detected as an extreme value of the absolute value of the luminance gradient of the pixel value on the above-described image. Herein, a point 604 in which the extreme value of the absolute value of the luminance gradient is higher than a predetermined threshold 605 and is also closest to the control point is set as the corresponding point.

Step S503

In step S503, a coefficient matrix and a error vector for solving the linear simultaneous equation are calculated. Herein, respective elements of the coefficient matrix are first-order partial differentiation coefficients with respect to the minute change of the estimated values of the position and orientation, and specifically, the partial differentiation coefficients of the image coordinates. The error vector is a distance between the projected edge and the detected edge on the image.

Figure 7:
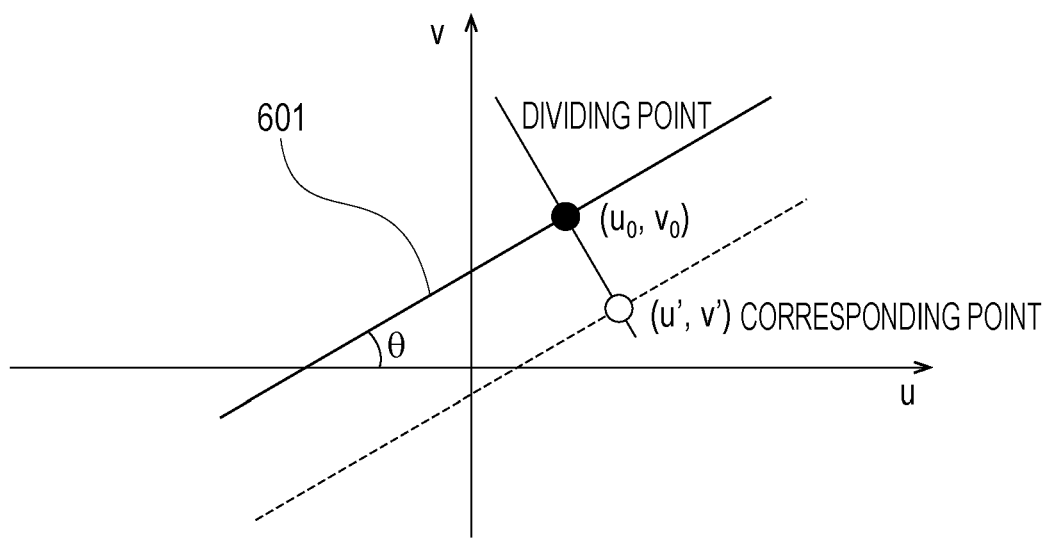
FIG. 7 is an explanatory diagram for describing a relationship between a projected position on an image of an edge and a detected edge according to the first to third exemplary embodiments.

FIG. 7 is an explanatory diagram for describing a projected position on the image of the edge and the detected edge. In FIG. 7, the horizontal direction and the vertical direction of the image are respectively set as the u axis and the v axis. A position on the image of a certain control point (point dividing the respective projected edges at equal intervals on the image) is set as $(u_0, v_0)$, and an inclination on the image of the edge to which this control point belongs is represented by an inclination θ with respect to the u axis. The inclination θ is calculated as an inclination of a straight line connecting coordinates on both ends on the image by projecting the three-dimensional coordinates on both ends of the edge onto the image on the basis of s. A normal vector on the image of this edge corresponds to (sin θ, −cos θ). The image coordinates of the corresponding point of this control point are set as (u', v'). Herein, the point (u, v) on the straight line that passes through the point (u', v') and has the inclination θ is represented as follows (θ is a constant).

$$u \sin θ - v \cos θ = d \quad (6)$$

Herein, d (constant) is represented as follows.

$$d = u' \sin θ - v' \cos θ \quad (7)$$

The position on the image of the control point changes depending on the position and orientation of the measurement target object 101. The degree-of-freedom of the position and orientation of the measurement target object 101 is six-degree-of-freedom. That is, s is a six-dimensional vector and constituted by three elements representing the position of the measurement target object 101 and three elements representing the orientation. The three elements representing the orientation is represented by, for example, a representation based on Eulerian angle, a three-dimensional vector in which the direction represents a rotation axis and the size represents a rotation angle, or the like. The image coordinates (u, v) of the control point changes depending on the position and orientation can be approximated in the vicinity of $(u_0, v_0)$ like Expression 8 by the first-order Taylor expansion. It is however noted that $\Delta s_i$ (i=1, 2, ..., 6) represents the minute changes of the respective components of s.

$$u \approx u_0 + \sum_{i=1}^{6} \frac{\partial u}{\partial s_i} \Delta s_i \quad (8)$$

$$v \approx v_0 + \sum_{i=1}^{6} \frac{\partial v}{\partial s_i} \Delta s_i$$

The position on the image of the control point obtained by the correct s can be assumed to be on the straight line represented by Expression 6. When u and v approximated by Expression 8 are assigned to Expression 7, Expression 9 can be obtained.

$$\sin θ \sum_{i=1}^{6} \frac{\partial u}{\partial s_i} \Delta s_i - \cos θ \sum_{i=1}^{6} \frac{\partial v}{\partial s_i} \Delta s_i = d - r \quad (9)$$

Where, r (constant) is set as follows.

$$r = u_0 \sin\theta - v_0 \cos\theta$$

The three-dimensional coordinates in the coordinate system of the image processing apparatus 104 can be transformed into the three-dimensional coordinates (x, y, z) in the model coordinate system by the position and orientation s of the measurement target object 101. It is assumed that a certain point is converted into a point $(x_0, y_0, z_0)$ in the model coordinate system by the estimated value of the position and orientation. (x, y, z) changes depending on the position and orientation of the measurement target object 101 and can be approximated in the vicinity of $(x_0, y_0, z_0)$ like Expression 9 by the first-order Taylor expansion.

$$x \approx x_0 + \sum_{i=1}^{6} \frac{\partial x}{\partial s_i} \Delta s_i \quad (10)$$

$$y \approx y_0 + \sum_{i=1}^{6} \frac{\partial y}{\partial s_i} \Delta s_i$$

$$z \approx z_0 + \sum_{i=1}^{6} \frac{\partial z}{\partial s_i} \Delta s_i$$

Since Expression 9 is established for all the edges where the association is performed in step S502, the linear simultaneous equation related to $\Delta s_i$ like Expression 11 is established.

$$\begin{bmatrix} \sin\theta_1 \frac{\partial u_1}{\partial s_1} - \cos\theta_1 \frac{\partial v_1}{\partial s_1} & \sin\theta_1 \frac{\partial u_1}{\partial s_2} - \cos\theta_1 \frac{\partial v_1}{\partial s_2} & \cdots & \sin\theta_1 \frac{\partial u_1}{\partial s_6} - \cos\theta_1 \frac{\partial v_1}{\partial s_6} \\ \sin\theta_2 \frac{\partial u_2}{\partial s_1} - \cos\theta_1 \frac{\partial v_2}{\partial s_1} & \sin\theta_2 \frac{\partial u_2}{\partial s_2} - \cos\theta_1 \frac{\partial v_2}{\partial s_2} & \cdots & \sin\theta_2 \frac{\partial u_2}{\partial s_6} - \cos\theta_1 \frac{\partial v_2}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \end{bmatrix} \quad (11)$$

Herein, Expression 11 is represented as Expression 12.

$$J\Delta s = E \quad (12)$$

The calculation for the partial differentiation coefficient for calculating a coefficient matrix J in the linear simultaneous equation of Expression 12 is performed, for example, by a method described in the following document.

V. Lepetit and P. Fua, "Keypoint recognition using randomized trees", IEEE Transactions on Pattern Analysis and Machine Intelligence, vol. 28, no. 9, 2006.

Step S504

In step S504, the position and orientation derivation unit 205 obtains $\Delta s$ by using a generalized inverse matrix $(J^T \cdot J)^{-1} \cdot J^T$ of the coefficient matrix J on the basis of Expression 12.

However, since many outliers due to misdetection or the like exist in the edge, the following robust estimation technique is used. In general, the error d−r is increased in the edges corresponding to outliers. For that reason, the contribution degree to the simultaneous equations of Expression 11 and Expression 12 is increased, and the accuracy of $\Delta s$ obtained as the result is decreased. In view of the above, a small weight is assigned to data having the large error d−r, and a large weight is assigned to data having the small error d−r. The weight is assigned, for example, by Tukey's function as represented by Expression 13.

$$w(d-r) = \begin{cases} (1 - ((d-r)/c_1)^2)^2 & |d-r| \le c_1 \\ 0 & |d-r| > c_1 \end{cases} \quad (13)$$

$c_1$ and $c_2$ are constants. The function of assigning the weight is not necessarily the Tukey's function, and for example, any function such as Huber's function may be used so long as a small weight is assigned to data having a large error, and a large weight is assigned to data having a small error.

A weight corresponding to each data (edge) is set as $w_i$. Herein, a weight matrix is defined as represented by Expression 14.

$$W = \begin{bmatrix} w_1 & & & 0 \\ & w_2 & & \\ & & \ddots & \\ 0 & & & w_{N_c} \end{bmatrix} \quad (14)$$

The weight matrix W is a square matrix in which components other than diagonal components are all 0, and a weight $w_i$ is input to each diagonal component. Expression 11 is transformed by using the weight matrix W into Expression 14.

$$WJ\Delta s = WE \quad (15)$$

A correction value $\Delta s$ is obtained by solving Expression 15 like Expression 16.

$$\Delta s = (J^T W J)^{-1} J^T W E \quad (16)$$

Step S505

In step S505, the position and orientation derivation unit 205 is updated by the correction value $\Delta s$ of the position and orientation calculated in step S504 to update the position and orientation to $s + \Delta s$.

Step S506

In step S506, the position and orientation derivation unit 205 determines whether the position and orientation are converged. When it is determined that the position and orientation are converged, the processing is ended while the position and orientation at that time are treated as fitting results. When it is determined that the position and orientation are not converged, the processings in steps S502 to S505 are repeatedly performed until the position and orientation are converged. In the convergence determination, the position and orientation are determined to be converged when it is determined that the correction amount in step S505 is lower than or equal to a predetermined value and hardly change. The method for the convergence determination is not limited to this method, and it may be determined that the position and orientation are converged in a case where the number of repetitions reaches a predetermined number.

As described above, the position and orientation of the measurement target object 101 are calculated by the processings in steps S501 to S506.

In the above-described explanation, the three-dimensional position and orientation are calculated, but the two-dimensional position and orientation may be calculated instead. In this case, the vector s corresponds to a three-dimensional vector constituted by two elements representing the position and one element representing the orientation.

The calculation method for the position and orientation of the measurement target object 101 according to the present exemplary embodiment is not limited to the Gauss-Newton method. For example, the calculation may be performed by Levenberg-Marquardt method in which the calculation is more robust or a steepest decent method which is a simpler method. In addition, the other non-linear optimized calculation technique such as a conjugate gradient method or ICCG method may be used.

Moreover, as the calculation method for the position and orientation of the measurement target object 101, the position and orientation of the measurement target object 101 may be estimated by holding the images of the target object picked up with various orientations as templates and performing the template matching (pattern matching) on the input image. For example, the calculation may be performed by the method described in the following document. That is, the images of the target object previously picked up with various orientations are held as reference images. Subsequently, the position and orientation of the measurement target object 101 may be estimated on the basis of the reference image in which the sum total of the errors of the distance between the correspondence of the edges to each other respectively extracted from the reference images and the input image becomes minimal.

Marcel German, "Automatic Pose Estimation For Range Images on the GPU", 3DMI, 2007.

MODIFIED EXAMPLE 1-1

According to the first exemplary embodiment, the approximate position and orientation are corrected on the basis of the positional relationship information held by the advance information holding unit 202, but the approximate position and orientation may be corrected on the basis of the measurement information obtained via the measurement information input unit 201.

Specifically, for example, the position of the projector may be estimated on the basis of the luminance image by a method described in the following document. Subsequently, by the method described in the first exemplary embodiment, a direction vector is obtained by projecting the direction vector from the measurement target object to the projector onto the image plane, and this direction vector is set as the correction direction. The light source is not limited to the projector, and the other light source may be used. For example, a fluorescent lamp illumination apparatus may be used.

Yukihiro Yamashita, Fumihiko Sakagami, Jun Sato, "Simultaneous estimation of shape and light source based on shadow projected onto non-plane", Meeting on Image Recognition and Understanding, 2011.

Figure 8A:
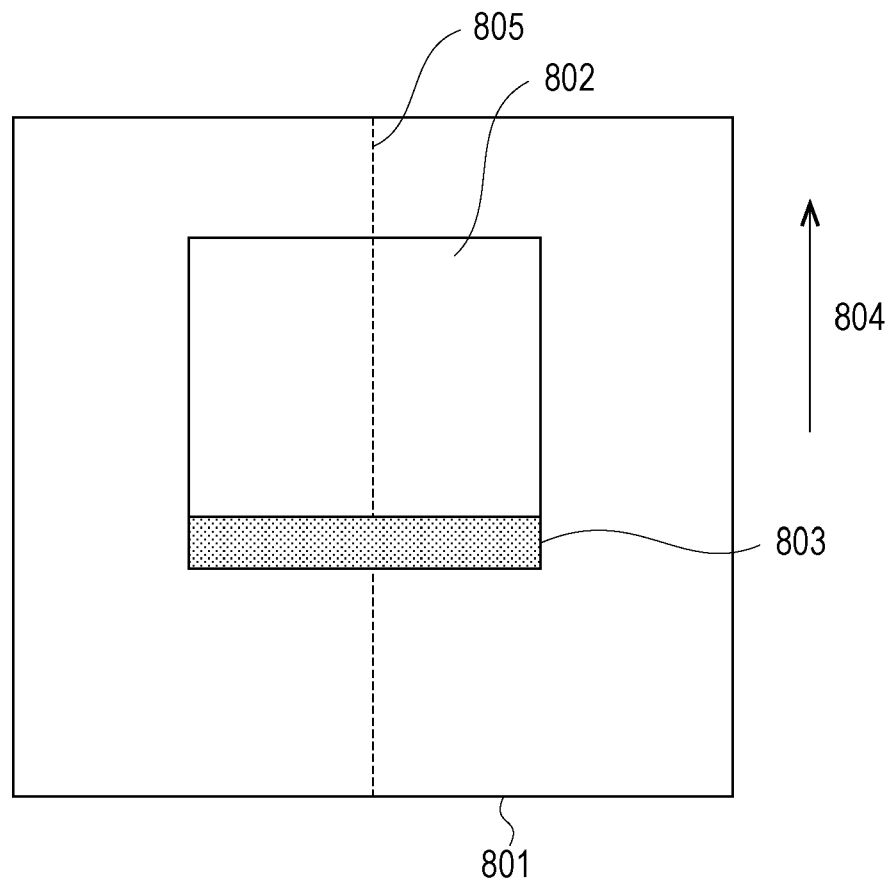
FIG. 8A is a schematic diagram of a luminance image in which a measurement target object is picked up according to the first exemplary embodiment.

With regard to the correction amount, parts continuously having low luminance values in the luminance image are extracted as the shadow region, and the correction amount is set as a width in the correction direction in the extracted shadow region. FIG. 8A is a schematic diagram of the luminance image in which the measurement target object 101 is picked up.

Figure 8B:
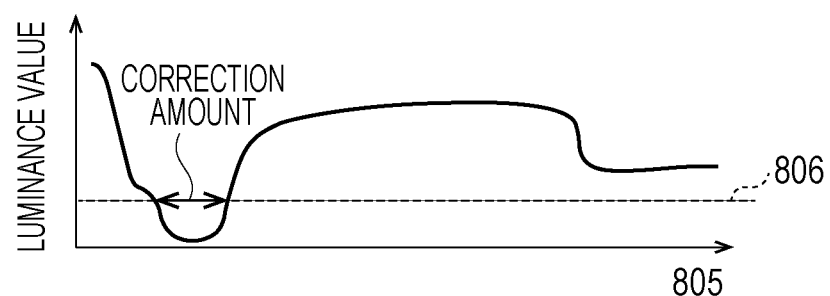
FIG. 8B illustrates a change in a luminance value in a search line of the luminance image in which the measurement target object is picked up according to the first exemplary embodiment.

A region 802 corresponds to a measurement target object region in a luminance image 801, and a region 803 corresponds to a shadow region. A search line 805 is set so as to extend in the correction direction 804 and also pass through the vicinity of the center of the shadow region. Luminance values of respective pixels on the search line 805 are obtained, and a continuous region where the luminance value becomes lower than a previously set threshold is detected. In FIG. 8B, the horizontal axis represents the search line 805, and the vertical axis represents the luminance value. A continuous width where the luminance value is lower than a previously set threshold 806 is detected, and this continuous width is set as the correction amount.

The correction direction and the correction amount may be obtained by the other method so long as the direction and the region of the shadow can be obtained. For example, the range image may be obtained at the same time as the luminance image of the measurement target object, and a region where the distance value of the range image is not obtained may be set as the shadow region. An outline of the shadow region may be extracted, and a direction from a point on the outline having a distance value closest to the light source to a point on the outline having a distance value farthest from the light source may be set as the shadow direction.

With regard to the correction direction or the correction amount, the value may be manually designated by a user via a user interface provided to the image processing apparatus 104. For example, the obtained luminance image is displayed on the monitor provided to the image processing apparatus 104, the user visually confirms the shadow region and the falling direction, and designates the correction direction or the correction amount by using the mouse, the key board, or the like.

Second Exemplary Embodiment

According to a second exemplary embodiment, a method of avoiding decrease in the stability of the position and orientation measurement of the measurement target object 905 because specular reflection on a measurement target object 905 is observed will be described.

As described in the first exemplary embodiment, in a case where an outline of the measurement target object or an edge other than an irregularity section is included in the edge (measurement edge) detected from the luminance image in which the measurement target object is picked up, the error occurs in the association of the edges to each other, and the measurement accuracy of the position and orientation may be decreased. The luminance value of the specular reflection region on the measurement target object is extremely higher than the luminance value of the surrounding region, and the edge is detected at the boundary of the specular reflection region. According to the first exemplary embodiment, the case where the shadow edge is included in the measurement edge has been described, but according to the present exemplary embodiment, a case where the edge of the boundary of the specular reflection region is included in the measurement edge will be described.

Although a basic configuration of the second exemplary embodiment is almost the same as that of the first exemplary embodiment, but the advance information held by the advance information holding unit 202 and the correction method (step S302) are different among the series of processing described in the first exemplary embodiment. Hereinafter, only the advance information held by the advance information holding unit 202 according to the present exemplary embodiment and the correction method will be described.

Figure 9:
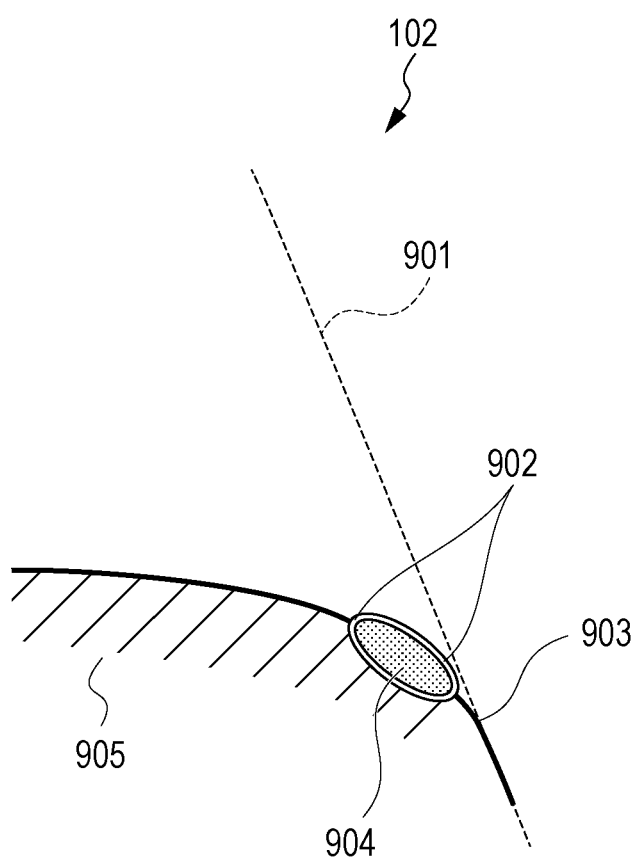
FIG. 9 is a schematic diagram illustrating a state in which specular reflection occurs on a measurement target object according to the second exemplary embodiment.

FIG. 9 is a schematic diagram illustrating a situation where the specular reflection occurs on the measurement target object 905. A contact point of an observation direction vector 901 of the image pickup apparatus 102 and the measurement target object 101 is an outline edge of the object. In FIG. 9, only the outline edge is illustrated, but in the case of an object having an irregularity shape, an edge is also generated in the irregularity section.

Hereinafter, the outline edge and the edge generated in the irregularity section are collectively referred to as structural edge. Since the specular reflection occurs, an edge 902 of the boundary of the specular reflection region is detected from the luminance image in which the measurement target object is picked up. For this reason, the model edge may be erroneously associated with the edge 902 of the boundary of the specular reflection region instead of the structural edge 903 depending on the approximate position and orientation.

In view of the above, a method of correcting the approximate position and orientation in order to inhibit the erroneous association of the model edge with the edge 902 of the boundary of the specular reflection region will be described.

Specifically, the previously obtained approximate position and orientation as described above are corrected on the basis of the information of the specular reflection region and the information of the positional relationship between the structural edge and the edge of the boundary of the specular reflection region closest from the structural edge.

The information of the specular reflection region 1004 is set as a center position of the specular reflection region. The information of the positional relationship between the structural edge and the edge of the boundary of the specular reflection region is set as a relative position between the center of the specular reflection region and an intersection point of the line segment extending from the center in the normal vector direction of the structural edge and the structural edge.

The advance information holding unit 202 holds the positional relationship between the projector 103 and the measurement target object 905, the positional relationship between the image pickup apparatus 102 and the measurement target object 905, and the geometric model of the measurement target object 905, a reflection characteristic as the advance information.

Figure 10:
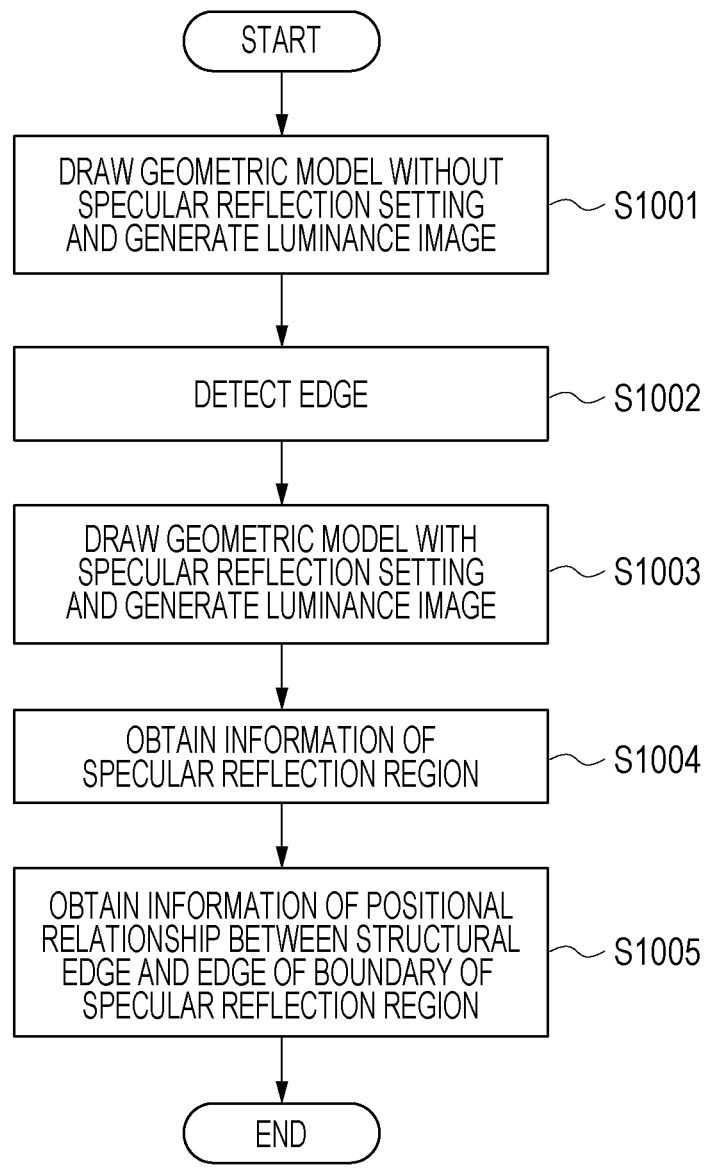
FIG. 10 is a flow chart of a processing procedure for advance information calculation according to the second exemplary embodiment.

A method of obtaining the information of the specular reflection region (reflection region information) and the information of the positional relationship between the structural edge and the edge of the boundary of the specular reflection region on the basis of these advance information will be described by using a flow chart illustrated in FIG. 10. According to the present exemplary embodiment, the description will be given while the processing of FIG. 10 is performed by the approximate position and orientation correction unit 204, but the present processing may be instead performed by the advance information holding unit 202 or the like.

Step S1001

In step S1001, the approximate position and orientation correction unit 204 draws a CG image of the geometric model of the measurement target object 905 in which an attribute of no specular reflection is set on the basis of the position and orientation of the camera in a predetermined light source environment (rendering) to generate a luminance image.

Step S1002

In step S1002, the approximate position and orientation correction unit 204 detects a section where the gradient of the luminance value is higher than or equal to a previously set threshold from the luminance image generated in step S1001 as an edge.

At this time, a structural edge of the measurement target object 905 is detected.

Step S1003

In step S1003, the approximate position and orientation correction unit 204 sets an attribute of the specular reflection (reflection characteristic) in the geometric model of the measurement target object 905 and draws the predetermined light source environment on the basis of the position and orientation of the image pickup apparatus 102 (rendering) to generate a luminance image. The attribute of the specular reflection is decided on the basis of a material of the measurement target object 905 or a change in reflection factor by a surface shape.

Step S1004

In step S1004, the approximate position and orientation correction unit 204 extracts a region where the luminance value is saturated from the luminance image generated in step S1003 as a specular reflection region. Subsequently, the center or outline of the region is extracted from the extracted specular reflection region. The extraction of the outline is performed by outline tracking which is a general technique for image processing. These are set as information of the specular reflection region.

Step S1005

In step S1005, the approximate position and orientation correction unit 204 decides the specular reflection region in the nearest vicinity (surrounding) from the structural edge detected in step S1002. For example, the specular reflection region where a distance between the structural edge and the center of the specular reflection region is shortest is decided to be in the nearest vicinity. Then, a relative position between the center of the specular reflection region and the intersection point of a line segment extending in a normal vector direction of the structural edge from the center of the specular reflection region and the structural edge is obtained. This relative position is set as information of positional relationship between the structural edge and the edge of the boundary of the specular reflection region.

Subsequently, this information is stored in the advance information holding unit 202.

It is noted that, in step S1001 and step S1003, the luminance images of the measurement target object 101 are generated the approximate position and orientation correction unit 204 draws the geometric model (rendering), but the method is not limited to this, and the other method may be employed. For example, instead of the processing in step S1001, the light source may be arranged in the position where the specular reflection does not occur, and the advance information holding unit 202 may hold the image in which the target object is picked up. In addition, instead of the processing in step S1003, the advance information holding unit 202 may hold the image in which the target object is picked up in the predetermined light source condition.

Next, a method for the approximate position and orientation correction unit 204 to correct the approximate position and orientation on the basis of the positional relationship information held by the advance information holding unit 202 will be described. Specifically, a vector AB from a center A of the specular reflection region to an intersection point B of the line segment extending from the center in the normal vector direction of the structural edge and the structural edge is obtained by using the advance information. The direction of this vector is set as the correction direction, the size of the vector is set as the correction amount, and this is added to the position X of the approximate position and orientation (the position X, the orientation R). Accordingly, the approximate position and orientation after the correction become the position (X+AB) and the orientation R.

The information of the specular reflection region is not limited to the center of the specular reflection region, and any information may be used so long as the position of the specular reflection region can be indicated. For example, an outline of the specular reflection region may be used. The information of the positional relationship between the structural edge and the edge of the boundary of the specular reflection region is not limited to the positional relationship between the center of the specular reflection region and the intersection point of the line segment extending from the center of the specular reflection region in the normal vector direction of the structural edge and the structural edge. Any information may be used so long as the positional relationship between the structural edge and the edge of the boundary of the specular reflection region can be indicated. For example, the information may be relative position between a point on the outline of the specular reflection region where a distance from the structural edge is minimal and an intersection point of a line segment extending from a point on the outline where the distance from the structural edge is minimal in the normal vector direction of the structural edge and the structural edge.

The processings in step S302 and subsequent steps are executed by using the correction amount and the correction direction calculated as described above similarly as in the first exemplary embodiment.

MODIFIED EXAMPLE 2-1

According to the second exemplary embodiment, the approximate position and orientation are corrected on the basis of the positional relationship information held by the advance information holding unit 202, but the approximate position and orientation may be corrected on the basis of the measurement information obtained via the measurement information input unit 201.

Specifically, the region where the luminance value is saturated is extracted from the luminance image in which the measurement target object is picked up as the specular reflection region, and the information such as the center or the outline position of the specular reflection is calculated as the information of the specular reflection region. In addition, the structural edge is extracted from the luminance image, and the positional relationship between the specular reflection region and the structural edge existing in the vicinity of the specular reflection region is calculated. Subsequently, the correction amount of the approximate position and orientation and the correction direction are decided by using the thus calculated information of the specular reflection region and the positional relationship between the specular reflection region and the structural edge existing in the vicinity of the specular reflection region.

The light source is not limited to the projector, and the other light source may be used. For example, a fluorescent lamp illumination apparatus may be used.

With regard to the correction direction or the correction amount, the value may be manually designated by a user via a user interface provided to the image processing apparatus 104. For example, the obtained luminance image is displayed on the monitor provided to the image processing apparatus 104, the user visually confirms the shadow region and the falling direction, and designates the correction direction or the correction amount by using the mouse, the key board, or the like.

Third Exemplary Embodiment

According to the third exemplary embodiment, a method of correcting the approximate position and orientation of the measurement target object 1101 to an orientation having a high probability where the measurement target object 1101 is arranged will be described. In a situation where the erroneous association may occur such as a case where edges are detected in a dense manner from the measurement target object 1101, the erroneous association is inhibited by setting the approximate position and orientation as close to the actual position and orientation as possible.

Although a basic configuration of the third exemplary embodiment is almost the same as the first and second exemplary embodiments, but the advance information held by the advance information holding unit 202 and the correction method (Step S302) are different among the series of processing described in the first and second exemplary embodiments. Hereinafter, only the advance information held by the advance information holding unit 202 and the correction method according to the present exemplary embodiment will be described.

An existing probability of the orientation of the measurement target object 1101 (probability information) is held as the advance information. A probability at which the orientation of the measurement target object 1101 may take is set as a stability of the orientation of the measurement target object 1101. The stability is calculated, for example, from an unlikelihood of falling when the object is arranged. According to the present exemplary embodiment, the stability is calculated by the following method.

First, a stable orientation of the object is decided. The stable orientation is set as an orientation of the object at a time when a surface, edges, or points extracted from the shape of the object contact the horizontal plane. The contact is determined when two or more edges are in contact in a case where only edges are in contact and when three or more points are in contact in a case where only points are in contact. The contact is also determined when two or more points are in contact in a case where the edge and the points are both in contact. The contact is also determined when at least one surface is in contact, and any numbers of edges and points may be in contact.

A surface is extracted from the convex shape of the object. A plane in contact with this surface is obtained, and it is determined whether or not the obtained plane does not intersect with the measurement target object. When it is determined that the plane intersects with the measurement target object, since the orientation of the object at a time when the obtained plane is set as the installation plane does not exist, it is determined that this is not the stable orientation. When it is determined that the plane does not intersect with the measurement target object, the orientation of the object at a time when the obtained plane is set as the installation plane is obtained, and this is set as the stable orientation.

Next, edges are extracted from the convex shape of the object, and two edges are arbitrarily selected from the extracted edges. A plane in contact with these edges is obtained, and it is determined whether or not the obtained plane does not intersect with the object. When it is determined that the plane intersects with the object, since the orientation of the object at a time when the obtained plane is set as the installation plane does not exist, it is determined that this is not the stable orientation. When it is determined that the plane does not intersect with object, the orientation of the object at a time when the obtained plane is set as the installation plane is obtained, and this is set as the stable orientation.

Next, points are extracted from the convex shape of the measurement target object, and three points are arbitrarily selected from the extracted points. A plane in contact with these points is obtained, and it is determined whether or not the obtained plane does not intersect with the measurement target object. When it is determined that the plane intersects with the measurement target object, since the orientation of the object at a time when the obtained plane is set as the installation plane does not exist, it is determined that this is not the stable orientation. When it is determined that the plane does not intersect with the measurement target object, the orientation of the object at a time when the obtained plane is set as the installation plane is obtained, and this is set as the stable orientation.

Next, one edge and one point are arbitrarily respectively selected from the edges and points extracted from the convex shape of the measurement target object. A plane in contact with the selected edge and point is obtained, and it is determined whether or not the obtained plane does not intersect with the measurement target object. When it is determined that the plane intersects with the measurement target object, since the orientation of the object at a time when the obtained plane is set as the installation plane does not exist, it is determined that this is not the stable orientation. When it is determined that the plane does not intersect with the measurement target object, the orientation of the object at a time when the obtained plane is set as the installation plane is obtained, and this is set as the stable orientation.

In the obtained stable orientation, the stability (unlikelihood of falling) is obtained. As the installation point of the object is farther from the center of gravity of the object, reactive force at the installation point is increased, and it is conceivable that the object at such an installation point is unlikely to fall. In addition, as the center of gravity is close to the horizontal plane, the change in torque caused by the minute orientation change of the object is decreased, and it is conceivable that the object at such a position is unlikely to fall. As an index in which these elements are combined with each other, a maximum angle among angles defined by vectors from the gravity center to the installation points and a vector that falls in a vertical direction with respect to the horizontal plane from the gravity center is set as the stability. As this defined angle is large, the stability is increased.

Figure 11:
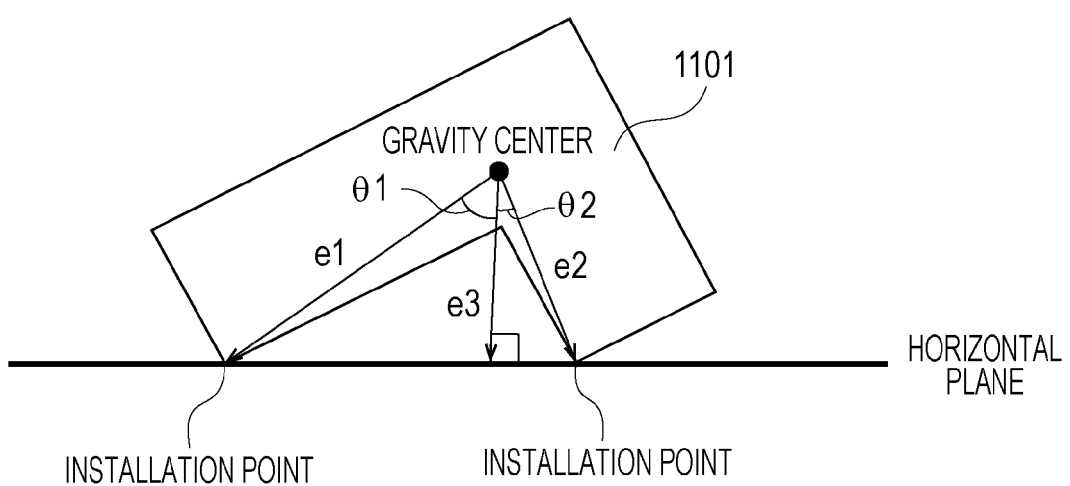
FIG. 11 illustrates an example of a stable orientation of a measurement target object according to the third exemplary embodiment.

FIG. 11 is an example lateral view as seen when the measurement target object 1101 is arranged in the stable orientation. By using FIG. 11, a calculation method for the stability will be described. First, vectors e1 and e2 from the gravity center of the measurement target object 1101 to the edges and vector e3 falling in the vertical direction with respect to the horizontal plane from the gravity center are calculated.

Subsequently, angles $\theta_1$ and $\theta_2$ defined by the vectors e1 and e2 from the gravity center of the measurement target object 1101 to the edges and the vector e3 falling in the vertical direction with respect to the horizontal plane from the gravity center are calculated. Sizes $\theta_1$ and $\theta_2$ are compared with each other, and the larger one is set as the stability. In this example, $\theta_1 > \theta_2$ is established, the stability is set as $\theta_1$. According to the above-described method, the stabilities at a time when the object is rotated about the vertical axis with respect to the horizontal plane and arranged are uniform.

The existing probability of the orientation may be obtained by a method other than the above-described method. For example, the position and orientation measurement of the measurement target object 1101 may be repeated plural times, and the frequency of the orientation obtained in each measurement may be obtained as the existing probability.

The existing probability of the orientation obtained by the above-described method is held by the advance information holding unit 202.

Figure 13:
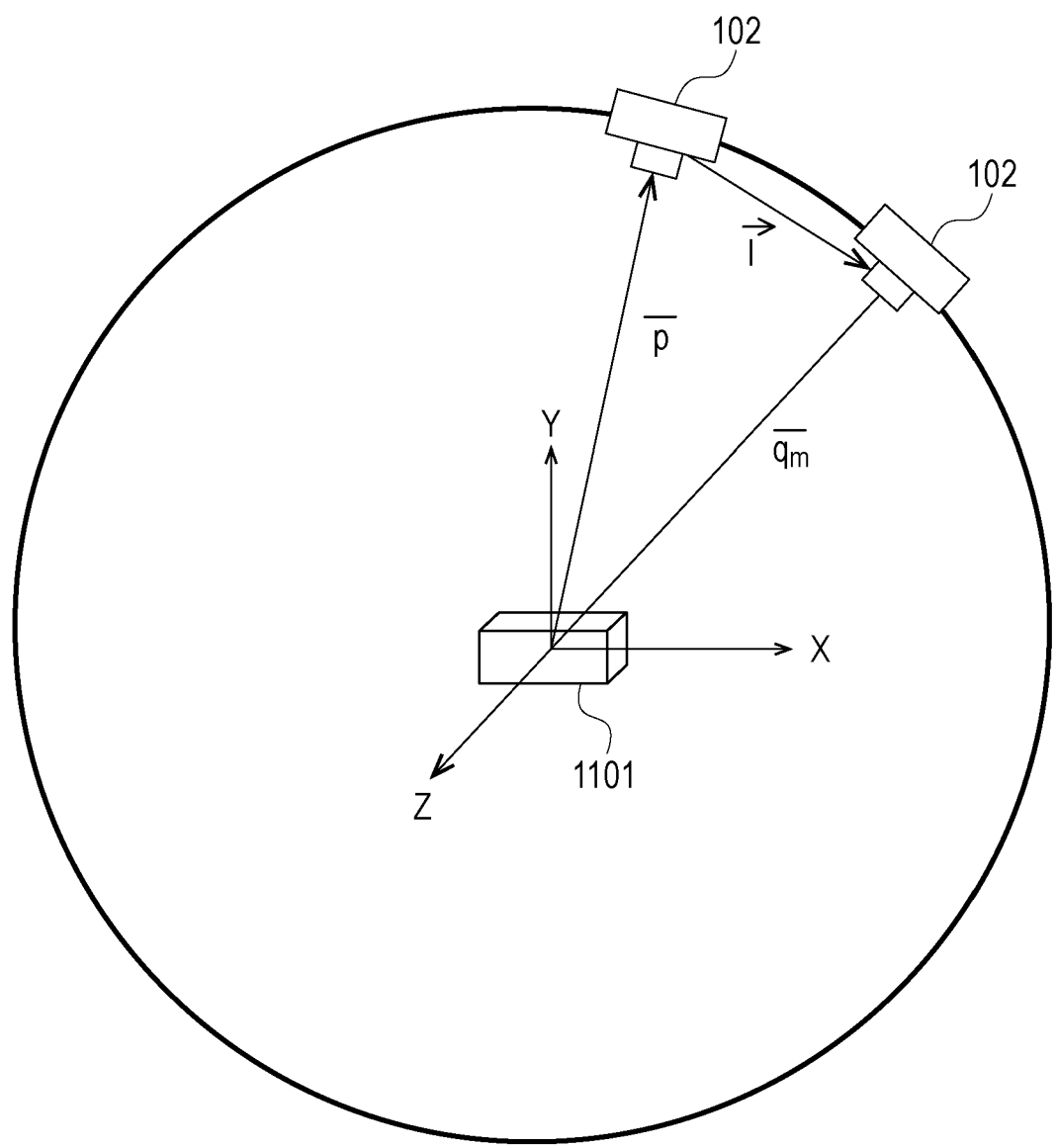
FIG. 13 illustrates an orientation relationship between the measurement target object and a camera according to the third exemplary embodiment.

Next, the correction method will be described. Herein, a sphere in which the measurement target object 101 illustrated in FIG. 13 is arranged at the origin is set, and a relative orientation between the measurement target object 1101 and the image pickup apparatus 102 is represented as a positional vector of the image pickup apparatus on a spherical surface.

First, the stable orientation closest to the approximate position and orientation is selected. The stable orientation closest to the approximate position and orientation is set as an orientation at a time when an inner product p·q among inner products p·q of a positional vector p of the camera in the approximate position and orientation and positional vectors q of the camera in the respective stable orientations becomes maximum.

Next, a line segment $l = p + \alpha \cdot p \cdot q_m$ ($0 \leq \alpha \leq 1$) connecting an end point of the positional vector p of the camera for the measurement target object in the approximate position and orientation to an end point of the positional vector $q_m$ of the camera in the stable orientation closest to the approximate position and orientation is calculated.

Subsequently, the image pickup apparatus is installed on one point on the line segment l, and the orientation of the measurement target object at this time is set as the orientation of the approximate position and orientation after the correction. The one point on the line segment l is decided on the basis of the existing probability of the maximum probability orientation. For example, when the existing probability of the maximum probability orientation is 70%, the point is set as a point on the line segment l at a time when α=0.7 is set. It is noted that when α is set as 1, the orientation of the approximate position and orientation after the correction is the same as the maximum probability orientation.

The processings on step S302 and subsequent steps are executed similarly as in the first exemplary embodiment by using the thus corrected approximate position and orientation.

Fourth Exemplary Embodiment

As an application case, the image pickup apparatus according to the present exemplary embodiment is preferably used for the position and orientation measurement of the target object in a system in which an industrial robot arm performs operation such as gripping, movement, or releasing of the target object, for example. Hereinafter, an application example of the image processing apparatus according to an exemplary embodiment of the present invention will be described by using FIG. 12.

Figure 12:
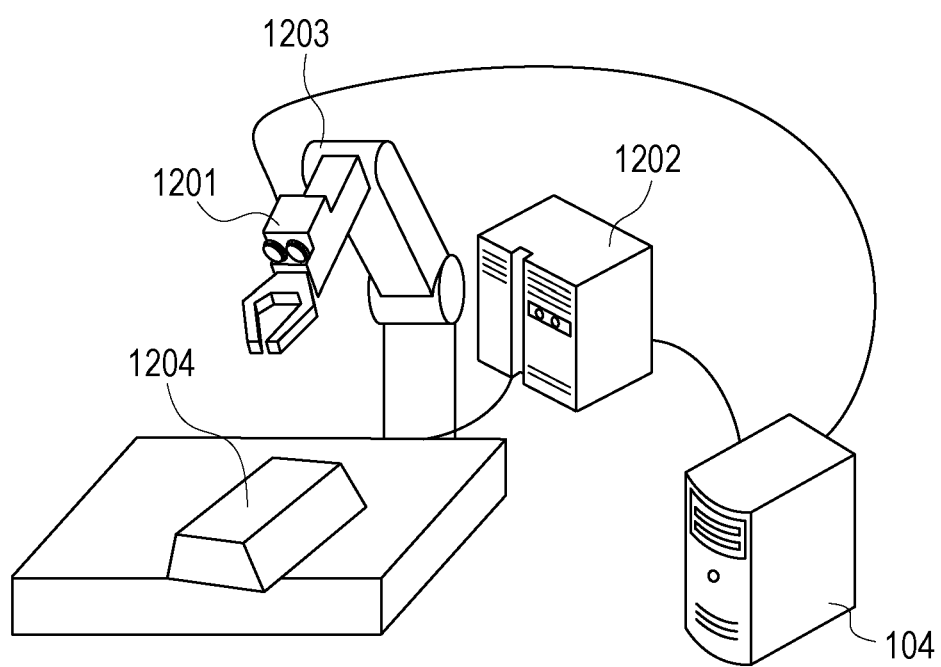
FIG. 12 illustrates an example configuration of a robot system according to a fourth exemplary embodiment.

FIG. 12 is a schematic diagram of an example schematic configuration of an information processing system including an image processing apparatus according to a fourth exemplary embodiment of the present invention. The configuration includes a camera and projector 1201. The image processing apparatus 104 and the camera and projector 1201 are the same as those in the system described in the first to third exemplary embodiments and store a program in which the processing procedure described above is described, so that the measurement of the position and orientation of a target object 1204 can be performed.

A robot controller 1202 controls a robot arm 1203. The robot arm 1203 includes a movable shaft composed of a rotation shaft and/of translational movement shaft. The robot controller 1202 is connected to the image processing apparatus 104. With regard to a command to the robot arm 1203, the position and orientation of the measurement target object 1204 received from the image processing apparatus 104 are converted into a specific control command to move the robot arm 1203.

The image processing apparatus 104 according to the present exemplary embodiment further includes the following processing procedure in addition to the above-described procedure. First, the system coordinate system described in the first to third exemplary embodiments, that is, a relative relationship of a robot coordinate system defined by the camera coordinate system and the robot arm is held. The image processing apparatus 104 measures the position and orientation of the measurement target object 1204 and converts the result from the camera coordinate system into the robot coordinate system. Next, the robot arm 1203 is moved to the position and orientation where the target object can be gripped via the robot controller 1202 on the basis of the position and orientation in the converted robot coordinate system of the measurement target object 1204. In a case where the object gripped by the robot arm 1203 is attached to the measurement target object 1204, the robot arm 1203 is moved to the position and orientation where the attachment can be performed via the robot controller 1202 on the basis of the position and orientation in the robot coordinate system of the gripping object and the target object.

As described above, the robot system according to the present exemplary embodiment measures the position and orientation even when the position and orientation of the measurement target object are not found, it is possible to perform gripping, attachment, or the like of the measurement target object.

Advantages of the Respective Exemplary Embodiments

According to the first exemplary embodiment, when the approximate position and orientation are corrected, even in a case where the shadow edge of the measurement target object is detected, the stability of the position and orientation measurement is improved by inhibiting the occurrence of the erroneous association, and the position and orientation measurement having the high robustness can be performed.

According to the second exemplary embodiment, when the approximate position and orientation are corrected, even in a case where the edge is detected at the boundary of the specular reflection region which is generated on the measurement target object, the stability of the position and orientation measurement is improved by inhibiting the occurrence of the erroneous association, and the position and orientation measurement having the high robustness can be performed.

According to the third exemplary embodiment, the approximate position and orientation can be corrected into the orientation having the high probability at which the orientation of the measurement target object exist. Accordingly, the stability of the position and orientation measurement is improved by inhibiting the occurrence of the erroneous association, and the position and orientation measurement having the high robustness can be performed.

According to the fourth exemplary embodiment, in the robot system where the camera and the projector are installed on the arm, the robot arm is processed on the basis of the measurement result of the position and orientation of the target object according to the exemplary embodiment of the present invention, so that it is possible to perform the operation such as gripping or attachment of the target object even when the position and orientation of the target object are not found.

Definition

The advance information according to the respective exemplary embodiments may be the information of the positional relationship between the light source and the camera and the height of the measurement target object as described in the first exemplary embodiment. In addition, as described in the second exemplary embodiment, the advance information may be the information of the positional relationship between the light source and the target object, the information of the positional relationship between the camera and the measurement target object, and the geometric model and the surface characteristic of the measurement target object. In addition, as described in the third exemplary embodiment, the advance information may be the existing probability of the orientation of the measurement target object. Any information may be used so long as the correction direction and the correction amount of the approximate position and orientation can be calculated.

The measurement information according to the respective exemplary embodiments is set as the luminance image in which the measurement target object is picked up, but in a case where the correction amount or the correction direction is decided by using the advance information, any information may be used so long as the information can be applied to the model fitting. For example, the range image in which the measurement target object is picked up may be used. In addition, in a case where the correction amount or the correction direction is decided by using the measurement information, any information may be used so long as the information can be applied to the model fitting, and the correction amount or the correction direction can be calculated by using the information. For example, three-dimensional point group information or the like measured by a laser range sensor or the like may be used.

The correction unit according to the respective exemplary embodiments may correct the approximate position and orientation on the basis of only the advance information, only the measurement information, or both the advance information and the measurement information as described in the first to third exemplary embodiments. In addition, in a case where one of the values of the correction direction and the correction amount of the approximate position and orientation is found in advance, the one of the value may be supplied as the given information.

The correction unit according to the present exemplary embodiment may calculate the correction direction and the correction amount on the basis of the information of the shadow direction and the shadow region as described in the first exemplary embodiment. In addition, as described in the second exemplary embodiment, the correction unit may calculate the correction direction and the correction amount on the basis of the information of the specular reflection region and the positional relationship between the specular reflection region and the structural edge existing in the vicinity of the specular reflection region. Moreover, as described in the third exemplary embodiment, the correction unit may calculate the approximate position and orientation after the correction on the basis of the position and orientation having the high existing probability.

According to the first exemplary embodiment, the description has been given that the position and orientation estimation unit according to the present exemplary embodiment estimates the three-dimensional position and orientation of the measurement target object, but the two-dimensional position and orientation may be estimated instead.

Advantages

According to the exemplary embodiments of the present specification, it is possible to perform the position and orientation measurement having the high robustness.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-229808, filed Nov. 5, 2013, which is hereby incorporated by reference herein in its entirety.

What is claimed is:

1. An image processing apparatus comprising:
one or more memory devices storing instructions for execution by one or more processors; and
the one or more processors, operable when executing the instructions to:
obtain an image including a target object;
hold model information of the target object;
obtain an approximate position and orientation of the target object included in the image;
estimate information related to a shadow region of the target object in the image;
correct the approximate position and orientation on the basis of the estimated information related to the shadow region;
associate the model information of the target object with image features of the target object in the image based on the corrected approximate position and orientation; and
derive a position and orientation of the target object in the image by updating the corrected approximate position and orientation on the basis of an association result.

2. The image processing apparatus according to claim 1, wherein the instructions to hold model information include further instructions to hold a positional relationship between a projecting unit configured to project light onto the target object and an image pickup unit configured to pick up the image, and
wherein the instructions to estimate information include further instructions to estimate a direction in which a shadow exists with respect to the position of the target object on the basis of the held positional relationship and the approximate position and orientation.

3. The image processing apparatus according to claim 2, wherein the instructions to estimate information include further instructions to obtain a height of the target object from the held model information and estimate a width of a shadow of the target object on the basis of the obtained height, the positional relationship, and the approximate position and orientation.

4. The image processing apparatus according to claim 1, wherein the instructions to obtain an image include further instructions to obtain at least one of a luminance image and a range image in which the target object is picked up, and
wherein the instructions to estimate information include further instructions to estimate information related to the shadow region on the basis of the luminance image or the range image.

5. The image processing apparatus according to claim 4, wherein the instructions to obtain an image include further instructions to obtain the luminance images and sets a region where the luminance value is lower than a predetermined value among the obtained luminance images as the shadow region.

6. The image processing apparatus according to claim 1, wherein the information related to the shadow region includes a size of the shadow region.

7. The image processing apparatus according to claim 1, wherein the instructions to correct the approximate position and orientation include further instructions to obtain a direction opposite to the estimated direction in which the shadow exists as a correction direction and corrects the approximate position and orientation in the correction direction.

8. The image processing apparatus according to claim 1, wherein the model information is a model representing a shape of the target object.

9. An image processing apparatus comprising:
one or more memory devices storing instructions for execution by one or more processors; and
the one or more processors, operable when executing the instructions to:
obtain an image including a target object;
hold model information of the target object;
obtain an approximate position and orientation of the target object included in the image;
estimate a reflection region of the target object in the image;
correct the approximate position and orientation on the basis of the estimated reflection region;
associate the model information of the target object with image features of the target object in the image based on the corrected approximate position and orientation; and
derive a position and orientation of the target object in the image by updating the corrected approximate position and orientation on the basis of an association result.

10. The image processing apparatus according to claim 9, wherein the instructions to hold model information include further instructions to search for the reflection region in an area surrounding an edge due to a shape of the target object and holds a positional relationship between the searched for reflection region and the edge, and wherein the instructions to correct the approximate position and orientation include further instructions to correct the approximate position and orientation on the basis of the positional relationship between the reflection region and the edge.

11. The image processing apparatus according to claim 10, wherein the instructions to correct the approximate position and orientation include further instructions to set a direction opposite to a direction in which the reflection region exists with respect to the edge as a correction direction from the held positional relationship between the reflection region and the edge and correct the approximate position and orientation in the correction direction.

12. The image processing apparatus according to claim 11, wherein the instructions to estimate information include further instructions to set a reflection characteristic of the target object as the model information and perform rendering on this set model in a predetermined light source environment to estimate a reflection region of the target object.

13. The image processing apparatus according to claim 9, wherein the instructions to obtain an image include further instructions to obtain at least one of a luminance image and a range image in which the target object is picked up, and wherein the instructions to estimate further instructions to estimate the reflection region on the basis of the luminance image or the range image.

14. The image processing apparatus according to claim 9, wherein the model information is a model representing a shape of the target object.

15. An image processing apparatus comprising:
one or more memory devices storing instructions for execution by one or more processors; and
the one or more processors, operable when executing the instructions to:
obtain an image including a target object;
hold model information of the target object and probability information of a position and orientation which the target object may take; and
obtain an approximate position and orientation of the target object included in the image;
correct the approximate position and orientation on the basis of the held probability information;
associate the model information of the target object with image features of the target object in the image based on the corrected approximate position and orientation; and
derive a position and orientation of the target object in the image by updating the corrected approximate position and orientation on the basis of an association result.

16. The image processing apparatus according to claim 15, wherein the model information is a model representing a shape of the target object.

17. A robot system comprising:
the image processing apparatus according to claim 1; and
instructions to grip the target object whose position and orientation are estimated by the instructions to estimate.

18. A robot system comprising:
the image processing apparatus according to claim 9; and
instructions to grip the target object whose position and orientation are estimated by the instructions to estimate.

19. A robot system comprising:
the image processing apparatus according to claim 15; and
instructions to grip the target object whose position and orientation are estimated by the instructions to estimate.

20. An image processing method comprising:
obtaining an image including a target object;
obtaining an approximate position and orientation of the target object included in the image;
estimating information related to a shadow region of the target object included in the image;
correcting the approximate position and orientation on the basis of the estimation information related to the shadow region;
associating the model information of the target object with image features of the target object in the image based on the corrected approximate position and orientation; and
deriving a position and orientation of the target object in the image by updating the corrected approximate position and orientation on the basis of an association result.

21. An image processing method comprising:
obtaining an image including a target object;
obtaining an approximate position and orientation of the target object included in the image;
estimating a reflection region of the target object in the image;
correcting the approximate position and orientation on the basis of the estimated reflection region;
associating the model information of the target object with image features of the target object in the image based on the corrected approximate position and orientation; and
deriving a position and orientation of the target object in the image by updating the corrected approximate position and orientation on the basis of an association result.

22. An image processing method comprising:
obtaining an image including a target object;
obtaining an approximate position and orientation of the target object included in the image;
correcting the approximate position and orientation on the basis of probability information of the target object held by a holding unit;
associating the model information of the target object with image features of the target object in the image based on the corrected approximate position and orientation; and
deriving a position and orientation of the target object in the image by updating the corrected approximate position and orientation on the basis of an association result.

23. A non-transitory storage medium storing a computer program for causing a computer to execute an image processing method comprising:
obtaining an image including a target object;
obtaining an approximate position and orientation of the target object included in the image;
estimating information related to a shadow region of the target object included in the image;
correcting the approximate position and orientation on the basis of the estimation information related to the shadow region;

associating the model information of the target object with image features of the target object in the image based on the corrected approximate position and orientation; and deriving a position and orientation of the target object in the image by updating the corrected approximate position and orientation on the basis of an association result.

24. A non-transitory storage medium storing a computer program for causing a computer to execute an image processing method comprising:

obtaining an image including a target object;

obtaining an approximate position and orientation of the target object included in the image;

estimating a reflection region of the target object in the image;

correcting the approximate position and orientation on the basis of the estimated reflection region;

associating the model information of the target object with image features of the target object in the image based on the corrected approximate position and orientation; and deriving a position and orientation of the target object in the image by updating the corrected approximate position and orientation on the basis of an association result.

25. A non-transitory storage medium storing a computer program for causing a computer to execute an image processing method comprising:

obtaining an image including a target object;

obtaining an approximate position and orientation of the target object included in the image;

correcting the approximate position and orientation on the basis of probability information of the target object held by a holding unit;

associating the model information of the target object with image features of the target object in the image based on the corrected approximate position and orientation; and deriving a position and orientation of the target object in the image by updating the corrected approximate position and orientation on the basis of an association result.

26. An image processing apparatus comprising:

one or more memory devices storing instructions for execution by one or more processors; and the one or more processors, operable when executing the instructions to:

obtain an image including a target object;

hold model information of the target object;

obtain an approximate position and orientation of the target object included in the image;

estimate information related to a shadow region of the target object in the image based on the obtained approximate position and orientation;

associate the model information of the target object with image features of the target object in the image based on the shadow region; and derive a position and orientation of the target object in the image based on an association result.

27. The apparatus according to claim 26, further comprising:

instructions to project the model information of the target object onto the image, wherein the instructions to derive further include instructions to derive the position and orientation of the target object in the image based on the estimated information related to the shadow region and the projected model information of the target object.

28. The apparatus according to claim 26, further comprising:

instructions to extract an image feature from the image.

29. The apparatus according to claim 28, wherein the model information is a feature on a line comprising three-dimensional shape of the object.

30. The apparatus according to claim 26, wherein the instructions to estimate further include instructions to estimate information related to a shadow region of the target object in the image based on the obtained approximate position and orientation of the target object and position information of an illumination device illuminating light pattern to the target object and an image capturing device capturing an image of the target object.

31. An image processing method comprising:

obtaining an image including a target object;

obtaining an approximate position and orientation of the target object included in the image;

estimating information related to a shadow region of the target object in the image based on the obtained approximate position and orientation;

associate the model information of the target object with image features of the target object in the image based on the shadow region; and deriving a position and orientation of the target object in the image based on an association result.

32. A non-transitory storage medium storing a computer program for causing a computer to execute an image processing method comprising:

obtaining an image including a target object;

obtaining an approximate position and orientation of the target object included in the image;

estimating information related to a shadow region of the target object in the image based on the obtained approximate position and orientation;

associating the model information of the target object with image features of the target object in the image based on the shadow region; and deriving a position and orientation of the target object in the image based on an association result.

* * * * *